(12) United States Patent
Choi et al.

(10) Patent No.: US 12,525,303 B2
(45) Date of Patent: *Jan. 13, 2026

(54) MEMORY DEVICE AND OPERATING METHOD THEREOF

(71) Applicant: Samsung Electronics Co., Ltd., Suwon-si (KR)

(72) Inventors: Yonghyuk Choi, Suwon-si (KR); Jaeduk Yu, Suwon-si (KR); Yohan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

This patent is subject to a terminal disclaimer.

(21) Appl. No.: 18/531,872

(22) Filed: Dec. 7, 2023

(65) Prior Publication Data
US 2024/0194274 A1    Jun. 13, 2024

(30) Foreign Application Priority Data

Dec. 12, 2022 (KR) .......................... 10-2022-0173063

(51) Int. Cl.
| | |
|---|---|
| *G11C 11/34* | (2006.01) |
| *G11C 16/04* | (2006.01) |
| *G11C 16/08* | (2006.01) |
| *G11C 16/28* | (2006.01) |
| *G11C 16/34* | (2006.01) |

(52) U.S. Cl.
CPC ...... *G11C 16/3404* (2013.01); *G11C 16/0433* (2013.01); *G11C 16/08* (2013.01); *G11C 16/28* (2013.01)

(58) Field of Classification Search
CPC . G11C 16/3404; G11C 16/0433; G11C 16/08; G11C 16/28

USPC ..................................................... 365/185.09
See application file for complete search history.

(56) References Cited

U.S. PATENT DOCUMENTS

| | | | | |
|---|---|---|---|---|
| 7,420,847 | B2* | 9/2008 | Li ..................... | G11C 11/5628 |
| | | | | 365/185.09 |
| 7,701,780 | B2* | 4/2010 | Mihnea ............. | G11C 16/3404 |
| | | | | 365/185.26 |
| 9,368,166 | B2* | 6/2016 | Kwak ..................... | G11C 7/22 |

(Continued)

FOREIGN PATENT DOCUMENTS

| | | | | |
|---|---|---|---|---|
| EP | 4181135 A1 | 5/2023 | | |
| KR | 20200027486 A | * | 3/2020 | ............. G11C 16/26 |
| KR | 20230068234 A | * | 5/2023 | ............. G11C 16/30 |

OTHER PUBLICATIONS

Extended European Search Report issued in corresponding European Application No. 23215662.0 (mailed Apr. 26, 2024).

*Primary Examiner* — Viet Q Nguyen
(74) *Attorney, Agent, or Firm* — Wolf, Greenfield & Sacks, P.C.

(57) ABSTRACT

A memory device includes a word line area that is between a bit line and a common source line. The word line area includes a plurality of stacks. A first area includes first stacks with a first resistance value in the word line area, a second area includes second stacks with a second resistance value in the word line area, wherein the second resistance value is different from the first resistance value, a third area includes third stacks with a third resistance value that different from the first resistance value, and a processor is configured to control a recovery sequence of the first area, the second area, and the third area.

20 Claims, 13 Drawing Sheets

(56) References Cited

U.S. PATENT DOCUMENTS

| | | | |
|---|---|---|---|
| 9,620,233 B1 | 4/2017 | Dong et al. | |
| 9,761,320 B1 | 9/2017 | Chen et al. | |
| 10,056,152 B2 | 8/2018 | Hahn et al. | |
| 10,629,272 B1 | 4/2020 | Lu et al. | |
| 10,636,500 B1 | 4/2020 | Chen et al. | |
| 10,685,723 B1 | 6/2020 | Chen et al. | |
| 10,726,891 B1 | 7/2020 | Prakash et al. | |
| 10,847,228 B2* | 11/2020 | Lee | G11C 16/0483 |
| 11,282,575 B2* | 3/2022 | Lee | H01L 25/18 |
| 11,615,855 B2* | 3/2023 | Choi | H01L 25/18 |
| | | | 365/185.02 |
| 12,119,046 B2* | 10/2024 | Yu | H10B 43/40 |
| 2014/0241064 A1 | 8/2014 | Lee et al. | |
| 2017/0168742 A1 | 6/2017 | Nam et al. | |
| 2018/0053554 A1 | 2/2018 | Nam et al. | |
| 2022/0130474 A1 | 4/2022 | Choi et al. | |
| 2024/0282377 A1* | 8/2024 | Lim | G11C 16/0433 |

\* cited by examiner

MEMORY DEVICE AND OPERATING METHOD THEREOF

CROSS-REFERENCE TO RELATED APPLICATION

This application is based on and claims priority under 35 U.S.C. § 119 to Korean Patent Application No. 10-2022-0173063, filed on Dec. 12, 2022, in the Korean Intellectual Property Office, the disclosure of which is incorporated by reference herein in its entirety.

FIELD

The inventive concept relates to a non-volatile memory device and an operating method of the non-volatile memory device, and more particularly, to a non-volatile memory device performing a recovery operation and an operating method of the non-volatile memory device.

BACKGROUND

Existing semiconductor devices may face problems such as deterioration that may occur after a read operation. Vertical NAND (VNAND) uses a stacking structure including a plurality of stacks with high integration, and accordingly, a more precise recovery control method may be desired.

SUMMARY

The inventive concept provides a memory device that performs a stable recovery operation and reduces or prevents the memory device from deteriorating by setting different recovery points in time for performing recovery operations for respective stacks of the memory device.

According to an aspect of the inventive concept, a memory device includes a word line area that is between a bit line and a common source line and includes a plurality of stacks including first, second, and third stacks. A first area includes the first stacks with a first resistance value in the word line area, a second area includes the second stacks with a second resistance value in the word line area, wherein the second resistance value is different from the first resistance value, a third area includes the third stacks with a third resistance value in the word line area that is different from the first resistance value, a processor is configured to control a recovery sequence of the first area, the second area, and the third area, wherein the processor is configured to perform a first recovery operation for the first area starting at a first point in time, and a second recovery operation for the second area and a third recovery operation for the third area starting at or after a second point in time that is different from the first point in time, for example, when a recovery value of the first area satisfies a first preset standard.

According to another aspect of the inventive concept, in an operating method of a memory device for recovering a word line area that is between a bit line and a common source line and includes a first area with a first resistance value in a word line area, a second area with a second resistance value in the word line area, wherein the second resistance value is different from the first resistance value, and a third area with a third resistance value that is different from the first resistance value, the operating method includes controlling a recovery sequence of the first area, the second area, and the third area, wherein the controlling of the recovery sequence includes starting a first recovery operation for the first area at a first point in time and starting recovery operations for the second area and the third area at or after a second point in time, for example, when a recovery value of the first area satisfies a preset first standard.

According to another aspect of the inventive concept, a memory device includes a word line area that is between a bit line and a common source line and includes a plurality of stacks including first, second, and third stacks. A first area includes the first stacks with a first resistance value in the word line area, a second area includes the second stacks with a second resistance value in the word line area, wherein the second resistance value is different from the first resistance value, a third area includes the third stacks with a third resistance value that different from the first resistance value in the word line area, a processor that is configured to control a recovery sequence of the first area, the second area, and the third area, wherein the processor is configured to perform a first recovery operation for the first area starting at a first point in time, and at least one of a second recovery operation for the second area or a third recovery operation for the third area starting at a second point in time that is different from the first point in time, for example, when a recovery value of the first area satisfies a first preset standard.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Terms used herein are briefly described, and embodiments are described in detail. The terms "comprises," "comprising," "includes" and/or "including," when used herein, specify the presence of stated elements, but do not preclude the presence of additional elements. The term "and/or" includes any and all combinations of one or more of the associated listed items.

Figure 1:
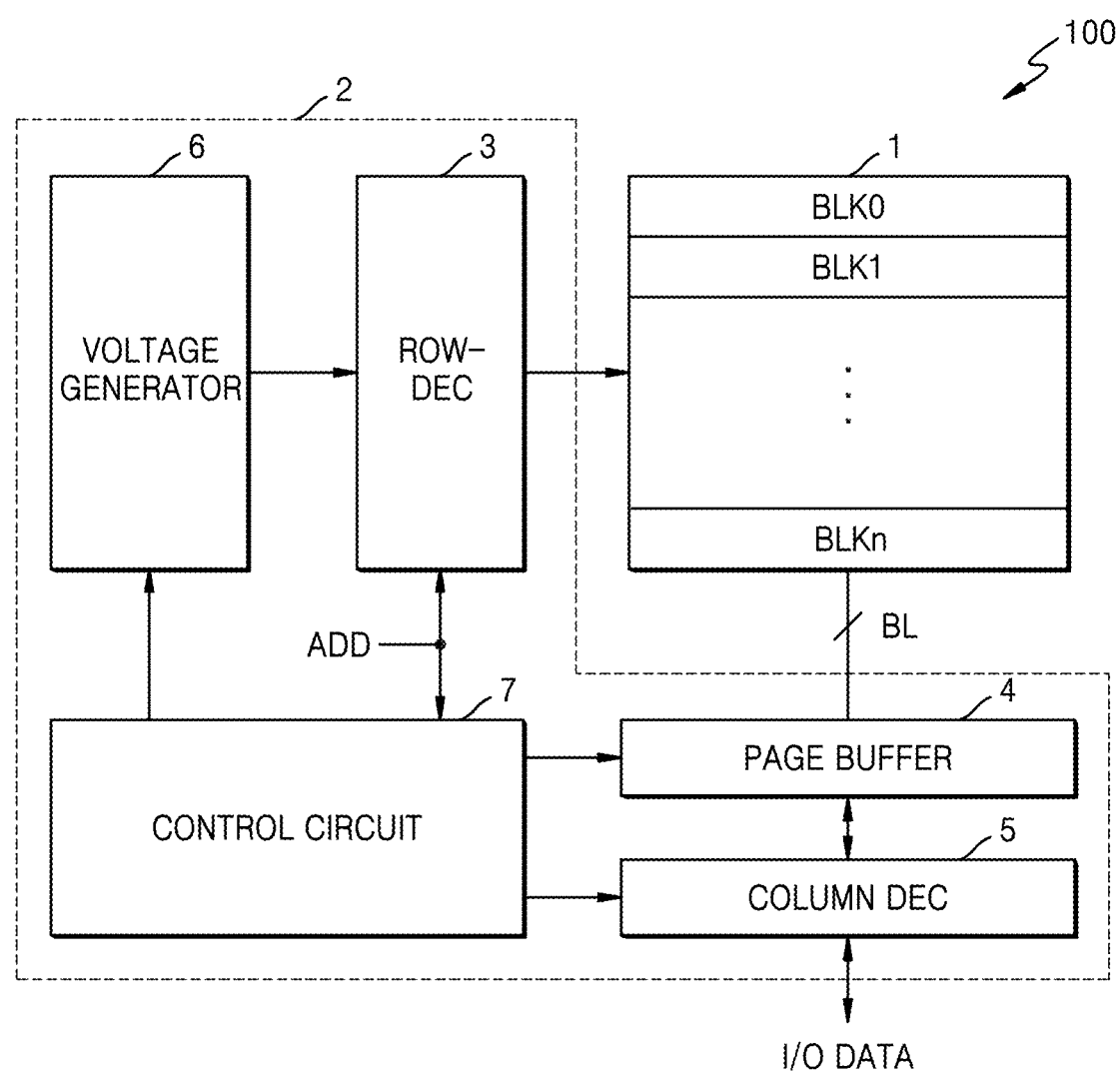
FIG. 1 is a block diagram of a memory device according to an embodiment.

FIG. 1 is a schematic block diagram of a memory device according to an embodiment.

Referring to FIG. 1, a memory device 100 according to an embodiment may be a three-dimensional (3D) memory device. The memory device 100 according to an embodiment may include a memory cell array 1 and a peripheral circuit 2 that controls the memory cell array 1. The peripheral circuit 2 may include a row decoder 3, a page buffer 4, a column decoder 5, a voltage generator 6, and a control circuit 7.

The memory cell array 1 may include a plurality of memory blocks BLK0 to BLKn, and each of the memory blocks BLK0 to BLKn may include a plurality of memory cells which are three-dimensionally arranged. In the embodiment, the memory blocks BLK0 to BLKn may include a plurality of cell strings configured in a NAND type. The memory blocks BLK0 to BLKn may be connected to the row decoder 3 through word lines and select lines. The term "connected" may be used herein to refer to a physical and/or electrical connection.

The row decoder 3 may decode an address ADD input from the outside to select one of the memory blocks BLK0 to BLKn and may select one of the word lines of the selected memory block. The page buffer 4 may be connected to the memory cell array 1 through bit lines to read information stored in the plurality of memory cells. The column decoder 5 may decode an address input from the outside to select one of the bit lines. The column decoder 5 may provide a data transmission path between the page buffer 4 and an external device (for example, a memory controller). The voltage generator 6 may generate voltages (for example, a program voltage, a read voltage, an erase voltage, and so on) required for internal operation of the memory cell array 1 under control by the control circuit 7.

Figure 2:
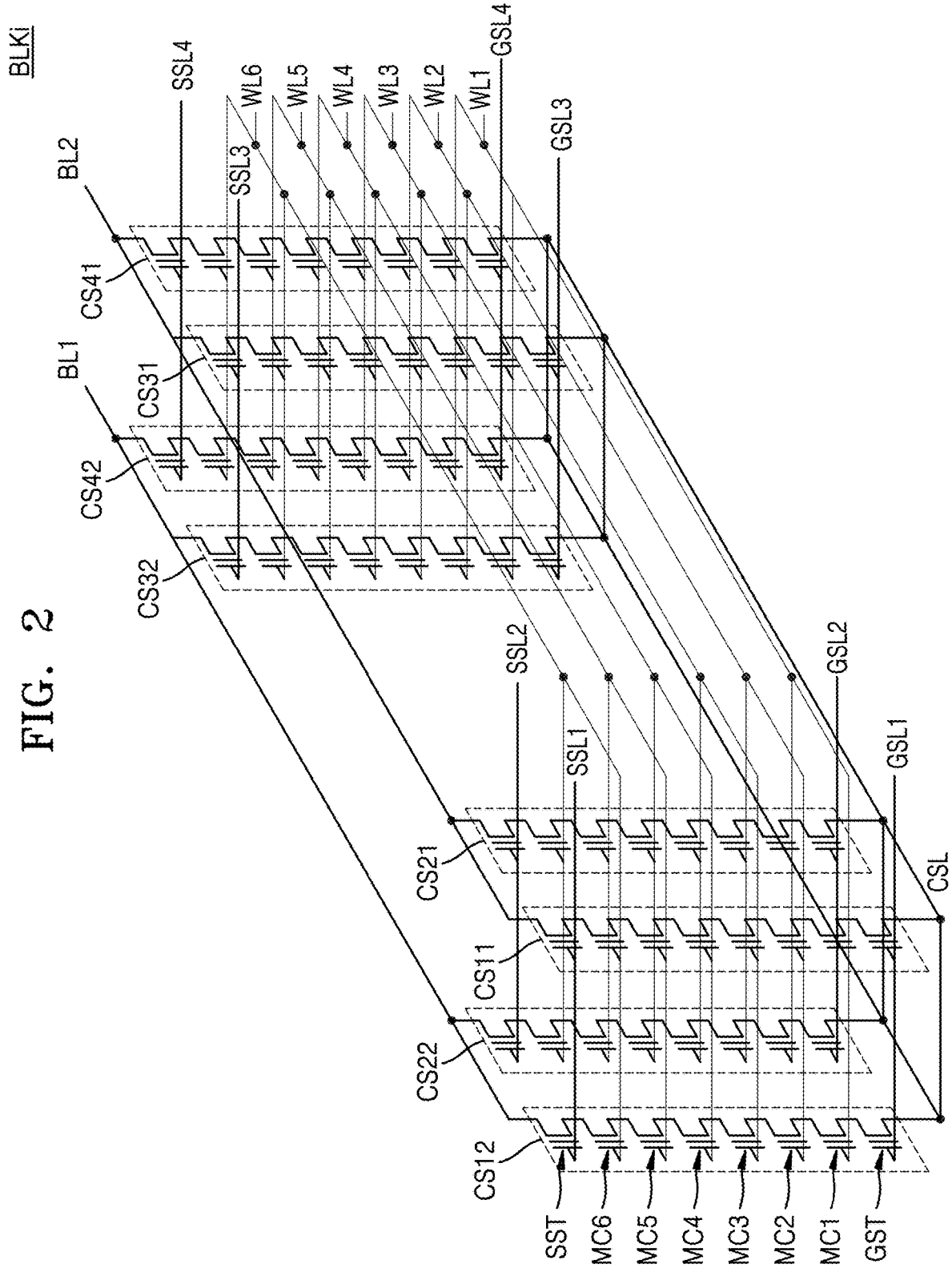
FIG. 2 is a circuit diagram illustrating a memory block according to an embodiment.

FIG. 2 is a circuit diagram illustrating a memory block BLKi according to an embodiment.

Referring to FIG. 2, the memory block BLKi may include a plurality of cell strings CS11 to CS41 and CS12 to CS42. The plurality of cell strings CS11 to CS41 and CS12 to CS42 may be arranged in row and column directions to form rows and columns.

Each cell string may include a ground select transistor GST, memory cells MC1 to MC6, and a string select transistor SST. The ground select transistor GST, the memory cells MC1 to MC6, and the string select transistor SST of each cell string may be stacked in a height direction perpendicular to a substrate.

Rows of the plurality of cell strings CS11 to CS41 and CS12 to CS42 may be respectively connected to different string select lines SSL1 to SSL4. For example, the string select transistors SST of the cell strings CS11 and CS12 may be commonly connected to the string select line SSL1. The string select transistors SST of the cell strings CS21 and CS22 may be commonly connected to the string select line SSL2. The string select transistors SST of the cell strings CS31 and CS32 may be commonly connected to the string select line SSL3. The string select transistors SST of the cell strings CS41 and CS42 may be commonly connected to the string select line SSL4.

Columns of the plurality of cell strings CS11 to CS41 and columns of the plurality of cell strings CS12 to CS42 may be respectively connected to bit lines BL1 and BL2 different from each other. For example, the string select transistors SST of the cell strings CS11 to CS41 may be commonly connected to the bit line BL1. The string select transistors SST of the cell strings CS12 to CS42 may be commonly connected to the bit line BL2.

Rows of the plurality of cell strings CS11 to CS41 and CS12 to CS42 may be respectively connected to ground select lines GSL1 to GSL4 different from each other. For example, the ground select transistors GST of the cell strings CS11 and CS12 may be commonly connected to the ground select line GSL1. The ground select transistors GST of the cell strings CS21 and CS22 may be commonly connected to the ground select line GSL2. The ground select transistors GST of the cell strings CS31 and CS32 may be commonly connected to the ground select line GSL3. The ground select transistors GST of the cell strings CS41 and CS42 may be commonly connected to the ground select line GSL4.

Memory cells at the same height from the substrate (or the ground select transistors GST) may be commonly connected to a same word line, and memory cells at different heights may be respectively connected to word lines WL1 to WL6 different from each other. For example, the memory cells MC1 may be commonly connected to the word line WL1. The memory cells MC2 may be commonly connected to the word line WL2. The memory cells MC3 may be commonly connected to the word line WL3. The memory cells MC4 may be commonly connected to the word line WL4. The memory cells MC5 may be commonly connected to the word line WL5. The memory cells MC6 may be commonly connected to the word line WL6.

The ground select transistors GST of the plurality of cell strings CS11 to CS41 and CS12 to CS42 may be commonly connected to a common source line CSL.

The memory block BLKi illustrated in FIG. 2 is an example. The inventive concept is not limited to the memory block BLKi illustrated in FIG. 2. For example, the number of rows of cell strings may be increased or decreased. As the number of rows of cell strings is changed, the number of string select lines connected to the rows of the cell strings and the number of cell strings connected to one bit line may also be changed. As the number of rows of cell strings is changed, the number of ground select lines connected to the rows of the cell strings may also be changed.

The number of columns of the cell strings may be increased or decreased. As the number of columns of cell strings is changed, the number of bit lines connected to the columns of the cell strings and the number of cell strings connected to one string select line may also be changed.

Heights of the cell strings may be increased or decreased. For example, the number of memory cells stacked in each of the cell strings may be increased or decreased. As the number of memory cells stacked in each of the cell strings is changed, the number of word lines may also be changed. For example, the number of string select transistors or ground select transistors provided in each of the cell strings may be increased. As the number of string select transistors or ground select transistors provided in each of the cell strings is changed, the number of string select lines or ground select lines may also be changed. When the number of string select transistors or ground select transistors is increased, the string select transistors or the ground select transistors may be stacked in the same form as the memory cells MC1 to MC6.

For example, writing and reading may be performed in units of rows of the plurality of cell strings CS11 to CS41 and CS12 to CS42. The plurality of cell strings CS11 to CS41 and CS12 to CS42 may be selected in units of rows by the ground select lines GSL1 to GSL4, and the plurality of cell strings CS11 to CS41 and CS12 to CS42 may be selected in units of rows by the string select lines SSL1 to SSL4. In addition, voltages may be applied to the ground select lines GSL1 to GSL4 in units of at least two ground select lines GSL1 to GSL2 or GSL3 to GSL4. One voltage may be applied to the ground select lines GSL1 to GSL4 as a unit. The ground select lines GSL1 to GSL4 according to an embodiment may be programmed to have a preset threshold voltage.

Writing to and reading from the selected row of the plurality of cell strings CS11 to CS41 and CS12 to CS42 may be performed in units of pages. The page may indicate one row of memory cells coupled to one word line. Memory cells of the selected row of the plurality of cell strings CS11 to CS41 and CS12 to CS42 may be selected in units of pages by the word lines WL1 to WL6.

Figure 3:
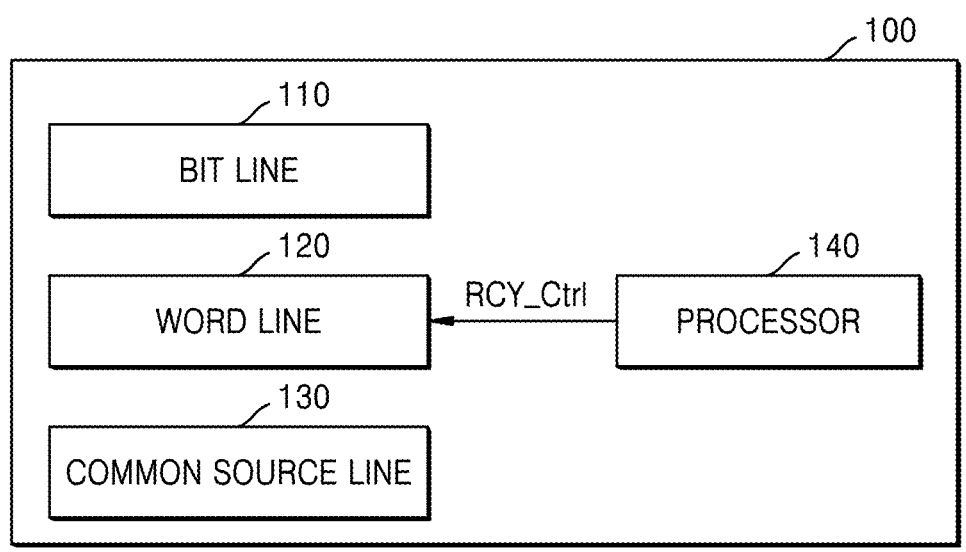
FIG. 3 is a block diagram illustrating a configuration of a memory device according to an embodiment.

FIG. 3 is a block diagram illustrating a configuration of a memory device according to an embodiment.

Referring to FIG. 3, a memory device 100 according to an embodiment may include a bit line 110, a word line 120, a common source line 130, and a processor 140. The processor 140 according to an embodiment may control a recovery operation of the memory device 100. In some embodiments, memory cell recovery operations may be used to increase memory device lifetime and reliability by reducing a likelihood that memory cells may become over-erased after experiencing repeated program/erase cycles.

The bit line 110 according to an embodiment may be connected to the word line 120, and the word line 120 may be connected to the common source line 130. For example, the word line 120 according to an embodiment may be between the bit line 110 and the common source line 130 and may be connected to the bit line 110 and the common source line 130. Although the bit line 110, the word line 120, and the common source lines 130 illustrated in FIG. 3 and described below are illustrated as blocks, each of the bit line 110, the word line 120, and the common source lines 130 may be composed of a plurality of lines. In addition, the word line 120 may collectively represent or comprehensively refer to a word line area where a plurality of word lines are arranged.

As described below, the word line 120 may be formed in a plurality of stacks between the bit line 110 and the common source line 130. The plurality of stacks according to an embodiment may be divided into a first area, a second area, and a third area depending on recovery speeds. For example, the first area may be a stack with the slowest recovery speed in the word line 120, the second area may be a stack with the second slowest recovery speed in the word line 120, and the third area may be a stack with the third slowest recovery speed in the word line 120. Although it is described that the memory device 100 according to an embodiment includes three stacks, the plurality of stacks of the word line 120 included in the memory device 100 are not limited thereto and may be four stacks or more.

The processor 140 according to an embodiment may control a recovery sequence of the first area, the second area, or the third area set in the word line 120. For example, the processor 140 may generate a recovery control signal RCY_Ctrl and perform recovery from a stack with slower recovery speed.

Figure 4:
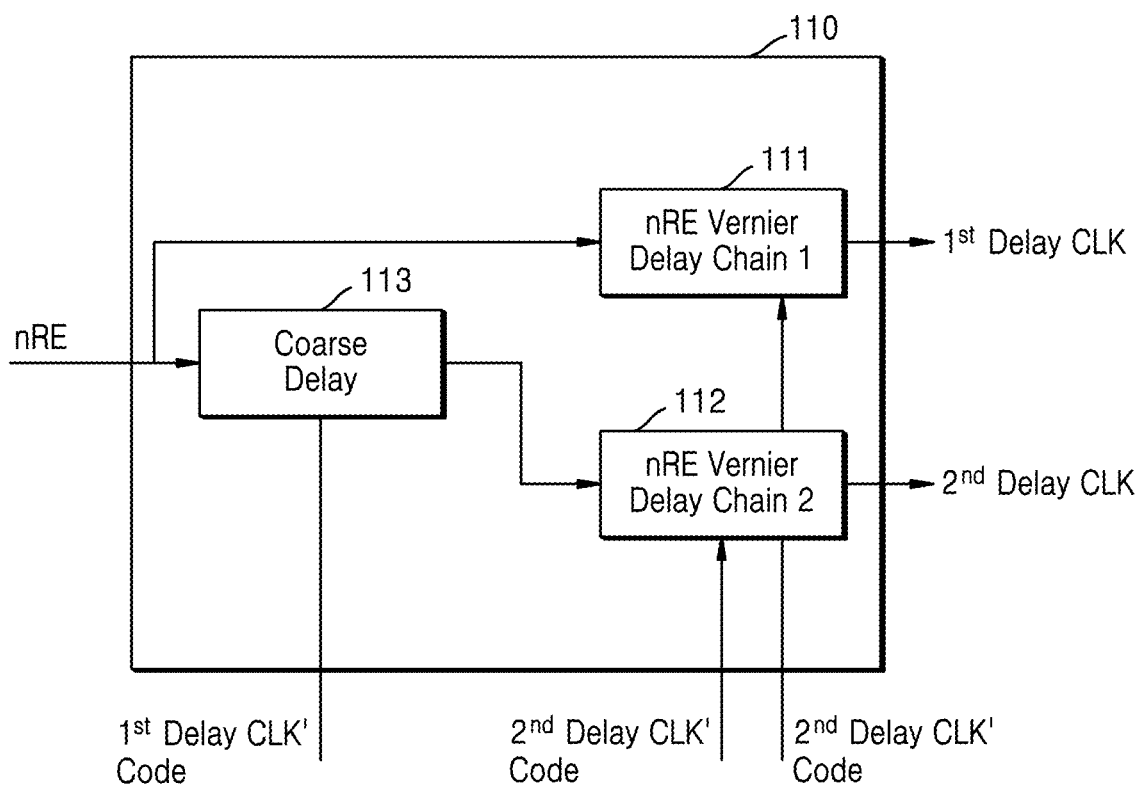
FIG. 4 is a block diagram illustrating an operation of a memory device according to an embodiment.

FIG. 4 is a block diagram illustrating an operation of a memory device according to an embodiment.

Referring to FIG. 4, the plurality of stacks of the word line 120 may be divided into a first area 121, a second area 122, and a third area 123. In addition, the processor 140 according to an embodiment may determine the recovery speed of the first area 121, the second area 122, or the third area 123, and may generate the recovery control signal RCY_Ctrl for controlling a recovery sequence of the first area 121, the second area 122, and the third area 123. For example, the processor 140 may determine the recovery speed of the first area 121, the second area 122, or the third area 123 based on a relative position of each stack and/or a relative resistance of each stack in the word line 120.

The first area 121 according to an embodiment may have a first resistance value, and the second area 122 according to an embodiment may have a second resistance value. In addition, the third area 123 according to an embodiment may have a third resistance value. According to one embodiment, the first resistance value may be greater than the second resistance value or the third resistance value. In addition, the second resistance value according to an embodiment may be equal to or greater than the third resistance value.

The processor 140 according to an embodiment may determine the recovery speed of the stacks based on the resistance values. For example, the processor 140 may determine that a stack with a large resistance value has relatively slow recovery speed and may determine a stack with a small resistance value has relatively fast recovery speed. When the first resistance value is greater than the second resistance value and the third resistance value, and the second resistance value is equal to the third resistance value, the processor 140 according to an embodiment may determine that the recovery speed of the first area 121 is less than the recovery speeds of the second area 122 and the third area 123, and may determine that recovery speeds of the second area 122 is equal to the recovery speed of the third area 123.

When the recovery speed of each stack is determined, the processor 140 according to an embodiment may control recovery to start from an area where the recovery speed is slower. For example, when the first resistance value is greater than the second resistance value and the third resistance value, and the second resistance value is equal to the third resistance value, the processor 140 according to an embodiment may determine that the recovery speed of the first area 121 is less than the recovery speeds of the second area 122 and the third area 123, and may start or initiate recovery of the first area 121 earlier than recovery of the second area 122 or the third area 123. Here, a point in time when the recovery of the first area 121 starts may be defined as a first point in time.

When a recovery value of the first area 121 satisfies a preset first standard, the processor 140 according to an embodiment may perform a recovery operation for the second area 122 and the third area 123. The preset first standard according to an embodiment may be a recovery value at a point in time when a recovery operation for the first area 121 and recovery operations of the second area 122 and the third area 123 may end at the same time. For example, the processor 140 according to an embodiment may perform the recovery operation for each area, but may control a recovery start point in time for each area such that all areas have the same end point in time. That is, the preset first standard may be set or determined such that the respective recovery operations for each area may be completed at the same ending time. For example, when a recovery value of the first area 121 satisfies the preset first standard, the processor 140 may start recovery operations for the second area 122 and the third area 123.

When it is determined that recovery speeds of the second area 122 and the third area 123 are equal to each other, the processor 140 according to an embodiment may simultaneously start recovery operations for the second area 122 and the third area 123. When the recovery operations for the second area 122 and the third area 123 start at the same time, a point in time when the recovery operations for the second area 122 and the third area 123 start may be defined as a second point in time.

The processor 140 according to an embodiment may determine that a resistance value of the first area 121, the second area 122, or the third area 123 is inversely proportional to the recovery speed. For example, when the first resistance value of the first area 121 is greater than the second resistance value of the second area 122, the processor 140 may determine that the recovery speed of the first area 121 is less than the recovery speed of the second area 122. In addition, when the second resistance value of the second area 122 is greater than the third resistance value of the third area 123, the processor 140 may determine that the recovery speed of the second area 122 is less than the recovery speed of the third area 123. When recovery speeds of the respective areas are determined, the processor 140 according to an embodiment may start or initiate performance of recovery operations in ascending order of recovery speed. For example, when the first resistance value is greater than the second resistance value and the second resistance value is greater than the third resistance value, the processor 140 may start the recovery operation for the first area 121 at a first point in time, and when a recovery value of the first area satisfies the preset first standard, the processor 140 may start the recovery operation for the second area 122 at a second point in time (which is after the first point in time), and may start a recovery operation for the third area 123 at a third point in time (which is after the second point in time).

According to one embodiment, the first point in time is a point in time when the recovery operation for the first area 121 starts, the second point in time is a point in time when the recovery operation for the second area 122 starts, and the third point in time is a point in time when the recovery operation for the third area 123 starts. According to one embodiment, the first point in time, the second point in time, and the third point in time may be different from each other. In addition, when the recovery speed of the second area 122 is equal to the recovery speed of the third area 123, the second point in time is the same as the third point in time.

The processor 140 according to an embodiment may also determine the recovery speed of a stack based on a distance from the bit line 110 or the common source line 130 to the stack. For example, when a resistance value of each stack is not known, the processor 140 may determine a stack in an area with the same distance to the bit line 110 and the common source line 130 as the first area 121. In addition, the second area 122 according to an embodiment may be in contact with the bit line 110, and the third area 123 may be in contact with the common source line 130.

According to one embodiment, when the second area 122 is in contact with the bit line 110 and the third area 123 is in contact with the common source line 130, a distance between the first area 121 and the bit line 110 may be greater than a distance between the second area 122 and the bit line 110, and a distance between the first area 121 and the common source line 130 may be greater than a distance between the third area 123 and the common source line 130. When the distance between the first area 121 and the bit line 110 may be greater than a distance between the second area 122 and the bit line 110 and the distance between the first area 121 and the common source line 130 may be greater than the distance between the third area 123 and the common source line 130, the processor 140 according to an embodiment may determine that the first area 121 is a stack farthest from an edge area and determine the first area 121 as an area with the slowest recovery speed. An edge area according to an embodiment may refer to an area adjacent to the bit line 110 or the common source line 130. When it is determined that the recovery speed of the first area 121 is the slowest, the processor 140 may cause the recovery operation for the first area 121 to start earlier than the recovery operations of the second area 122 and the third area 123, such that the recovery operations for two or more of the areas 121, 122, 123 may be completed at a similar or same time.

Figure 5:
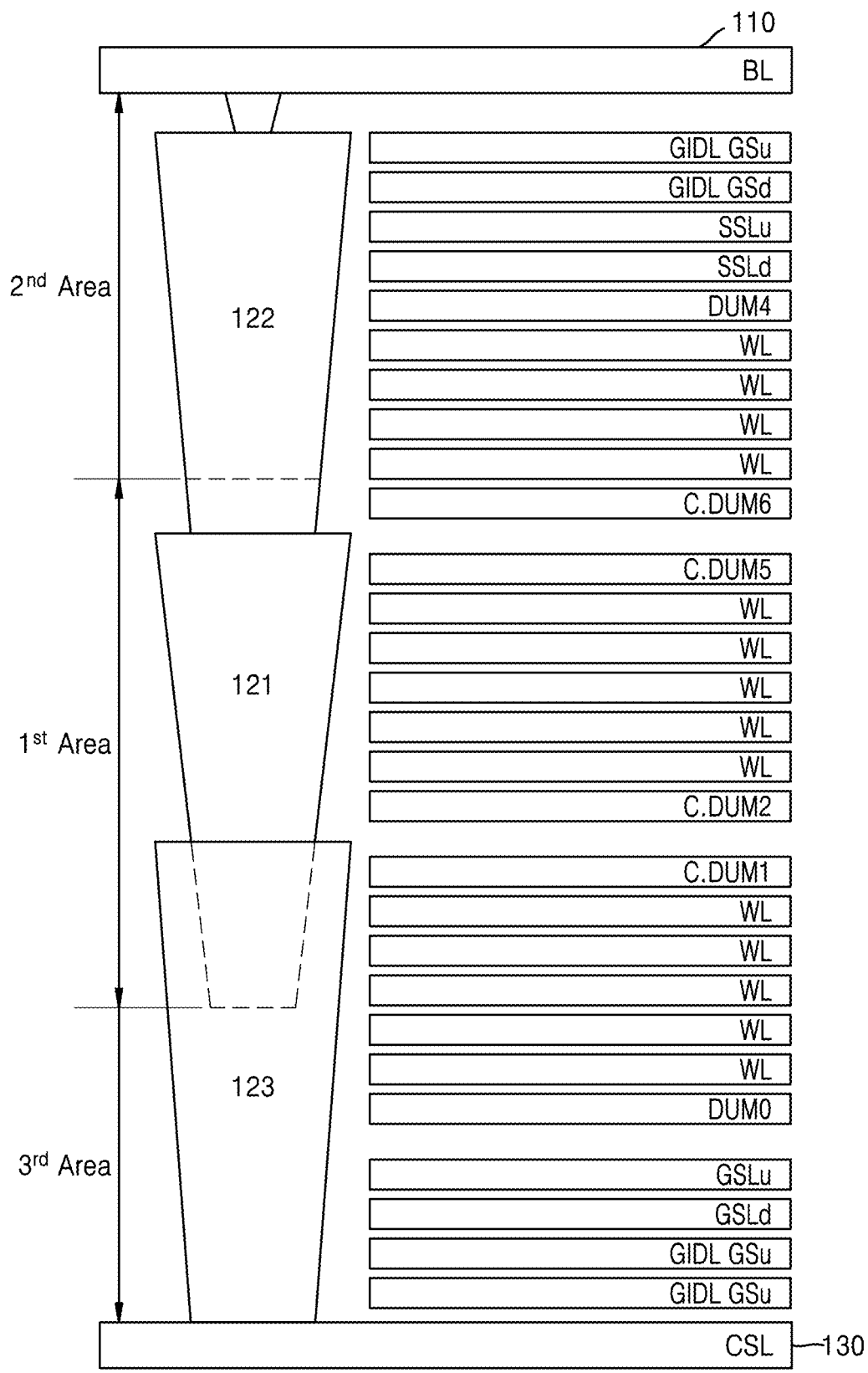
FIG. 5 illustrates a memory device composed of a plurality of stacks, according to an embodiment.

FIG. 5 illustrates that a memory device according to an embodiment includes a plurality of stacks.

Referring to FIG. 5, a memory device 100 according to an embodiment may include a plurality of stacks. The plurality of stacks according to an embodiment may be provided between the bit line BL 110 and the common source line CSL 130. Although three stacks are illustrated in FIG. 5, the stacks are not limited thereto and the memory device 100 may include four stacks or more.

A first area 121 according to an embodiment may be in an area with the same distance to the bit line 110 and the common source line 130. In addition, a second area 122 according to an embodiment may be in contact with the bit line 110, and a third area 123 may be in contact with the common source line 130.

The first area 121 according to an embodiment may include a plurality of word lines WL and may include dummy lines C.DUM5 and C.DUM6 adjacent to the second area 122. In addition, the first area 121 according to an embodiment may include dummy lines C.DUM1 and C.DUM2 adjacent to the third area 123. In the first area 121 according to an embodiment, an area including the plurality of word lines WL may be defined as a central area, and an area including the dummy lines C.DUM1, C.DUM2, C.DUM5, and C.DUM6 may be defined as a dummy area.

When the recovery operation for the first area 121 is performed, the processor 140 according to an embodiment may divide the first area 121 into a central area and a dummy area and may perform the recovery operation for the central area earlier than the recovery operation for the dummy area. For example, when a recovery value of the central area reaches a preset second standard, the processor 140 may cause the recovery operation for the dummy area to start. The preset second standard according to an embodiment may be a recovery value at a point in time when the recovery operation for the central area and the recovery operation for the dummy area may simultaneously end. That is, the preset second standard may set or determined such that the respective recovery operations for lines within a particular area may be completed at the same ending time.

Even when there is an unselected word line in the first area 121, the processor 140 according to an embodiment may divide the first area 121 into a central area and a dummy area and perform the recovery operation for the central area earlier than the recovery operation for the dummy area. For example, when there is an unselected word line in the first area 121 and a recovery value of the central area reaches the preset second standard, the processor 140 may cause the recovery operation for the dummy area.

By separately performing recovery operations of the central area and the dummy area in the first area 121, the memory device 100 according to an embodiment may reduce or prevent the dummy area from deteriorating.

The second area 122 according to an embodiment may include drain gates GIDL GSu and GIDL GSd and cell string select lines SSLu and SSLd in an edge area thereof. In addition, the second area 122 according to an embodiment may include a plurality of word lines WL, and a dummy line DUM4 may be provided between the plurality of word lines WL and the cell string select lines SSLu and SSLd.

The third area 123 according to an embodiment may include drain gates GIDL GSu and GIDL GSd and ground select lines GSLu and GSLd in an edge area thereof. In addition, the second area 122 according to an embodiment may include a plurality of word lines WL, and a dummy line DUM0 may be provided between the plurality of word lines WL and the cell string select lines SSLu and SSLd.

Figure 6:
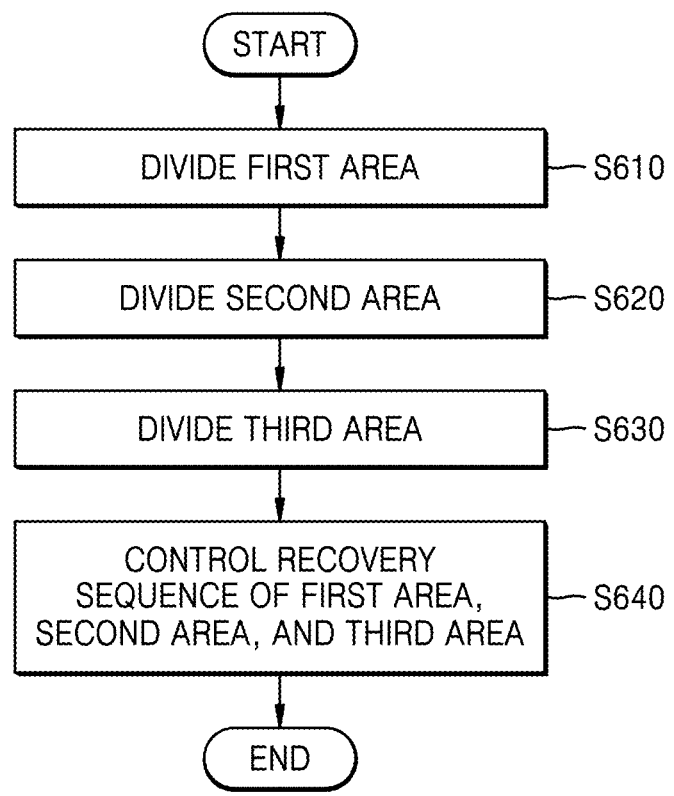
FIG. 6 is a flowchart of an operating method of a memory device, according to an embodiment.

FIG. 6 is a flowchart of an operating method of a memory device, according to an embodiment.

Referring to FIG. 6, the memory device 100 according to an embodiment may divide the first area 121 (S610).

The memory device 100 according to an embodiment may divide the first area 121 based on the recovery speed of the respective stacks. For example, the memory device 100 may divide the first area 121 based on resistance values of the respective stacks. The first area 121 according to an embodiment may include word lines that have a first resistance value. The first area 121 according to an embodiment may be an area with the slowest recovery speed among the plurality of stacks.

When the first area 121 is divided, the memory device 100 according to an embodiment may divide the second area 122 (S620).

The memory device 100 according to an embodiment may divide the second area 122 based on the recovery speed of the respective stacks. For example, the memory device 100 may divide the second area 122 based on the resistance values of the respective stacks. The second area 122 according to an embodiment may include word lines that have a second resistance value. The second area 122 according to an embodiment may be an area with the second slowest recovery speed among the plurality of stacks.

When the second area 122 is divided, the memory device 100 according to an embodiment may divide the third area 123 (S630).

The memory device 100 according to an embodiment may divide the third area 123 based on the recovery speed of the respective stacks. For example, the memory device 100 may divide the third area 123 based on resistance values of the respective stacks. The third area 123 according to an embodiment may include word lines that have a third resistance value. The third area 123 according to an embodiment may be an area with the third slowest recovery speed among the plurality of stacks.

According to one embodiment, the first resistance value may be greater than the second resistance value or the third resistance value. In addition, the second resistance value according to an embodiment may be equal to or greater than the third resistance value.

When the first area 121, the second area 122, and the third area 123 are divided, the memory device 100 according to an embodiment may control a recovery sequence of the first area 121, the second area 122, and the third area 123 (S640).

The memory device 100 according to an embodiment may determine the recovery speed of the first area 121, the second area 122, or the third area 123, and the recovery control signal RCY_Ctrl for controlling the recovery sequence of the first area 121, the second area 122, or the third area 123 based on the determination result.

For example, the memory device 100 may determine the recovery speed of the first area 121, the second area 122, or the third area 123 based on a position of each stack and/or a resistance value of each stack. The processor 140 according to an embodiment may determine the recovery speed of each stack based on the resistance value. For example, the processor 140 may determine that a stack with a large resistance value has a relatively slow recovery speed and may determine that a stack with a small resistance value has a relatively fast recovery speed. When the first resistance value is greater than the second resistance value and the third resistance value, and the second resistance value is equal to the third resistance value, the processor 140 according to an embodiment may determine that the recovery speed of the first area 121 is less than the recovery speed of the second area 122 and the recovery speed of the third area 123, and determine that the recovery speed of the second area 122 is equal to the recovery speed of the third area 123.

When the recovery speed of each stack is determined, the processor 140 according to an embodiment may cause recovery to be performed starting from an area with slower recovery speed. For example, when it is determined that the recovery speed of the second area 122 is equal to the recovery speed of the third area 123, the processor 140 starts the recovery operation for the first area 121 first, and subsequently may simultaneously start the recovery operation for the second area 122 and the recovery operation for the third area 123.

Figure 7:
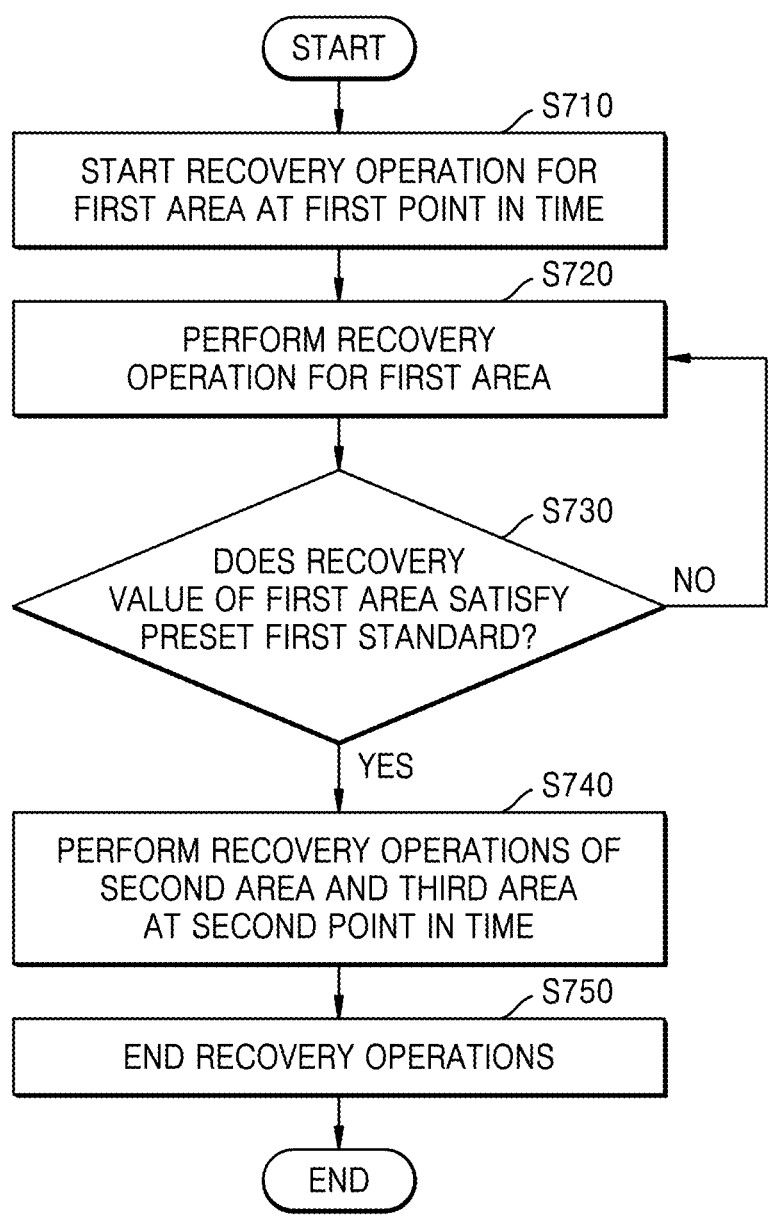
FIG. 7 is a flowchart illustrating a process of performing a recovery operation of an operating method of a memory device, according to an embodiment.

FIG. 7 is a flowchart of a process of performing a recovery operation of an operating method of a memory device, according to an embodiment.

Referring to FIG. 7, the memory device 100 according to an embodiment may start the recovery operation for the first area 121 at a first point in time (S710).

The memory device 100 according to an embodiment may determine a stack in an area with the same distance to the bit line 110 and the common source line 130 as the first area 121. When it is determined that a distance between the first area 121 and the edge area is greater than a distance between the second area 122 and the edge area and a distance between the third area 123 and the edge area, the memory device 100 according to an embodiment may determine that the recovery speed of the first area 121 is the slowest and start the recovery operation for the first area 121 before starting recovery operations for the second area 122 or third area 123. The first point in time according to an embodiment may be a point in time when the recovery operation for the first area 121 starts.

When the recovery operation for the first area 121 starts, the memory device 100 according to an embodiment may perform the recovery operation for the first area 121 (S720). For example, the memory device 100 may perform the recovery operation until the first area 121 reaches a preset first standard.

When the recovery operation for the first area 121 is performed, the memory device 100 according to an embodiment may determine whether a recovery value of the first area 121 satisfies the preset first standard (S730).

The preset first standard according to an embodiment may be a recovery value at a point in time when the recovery operation for the first area 121, the recovery operation for the second area 122, and the recovery operation for the third area 123 may simultaneously end. For example, the processor 140 according to an embodiment may perform the recovery operation for each area, but may independently control a recovery start point in time for each area to have the same end point in time.

When it is determined that a recovery value of the first area 121 satisfies the preset first standard, the memory device 100 according to an embodiment may perform the recovery operation for the second area and the recovery operation for the third area at a second point in time (S740). According to one embodiment, the second point in time may be a point in time when the recovery operation for the second area 122 starts, and a third point in time may be a point in time when the recovery operation for the third area 123 starts. According to one embodiment, when the recovery speed of the second area 122 is equal to the recovery speed of the third area 123, points in time when the recovery operation for the second area 122 and the recovery operation for the third area 123 start may be the same as the second point in time.

However, when it is determined that the recovery value of the first area 121 does not satisfy the preset first standard, the memory device 100 according to an embodiment may continuously or continue to perform the recovery operation for the first area 121.

When the recovery operations of the second area 122 and the third area 123 are completed, the memory device 100 according to an embodiment may end the recovery operations (S750).

Figure 8:
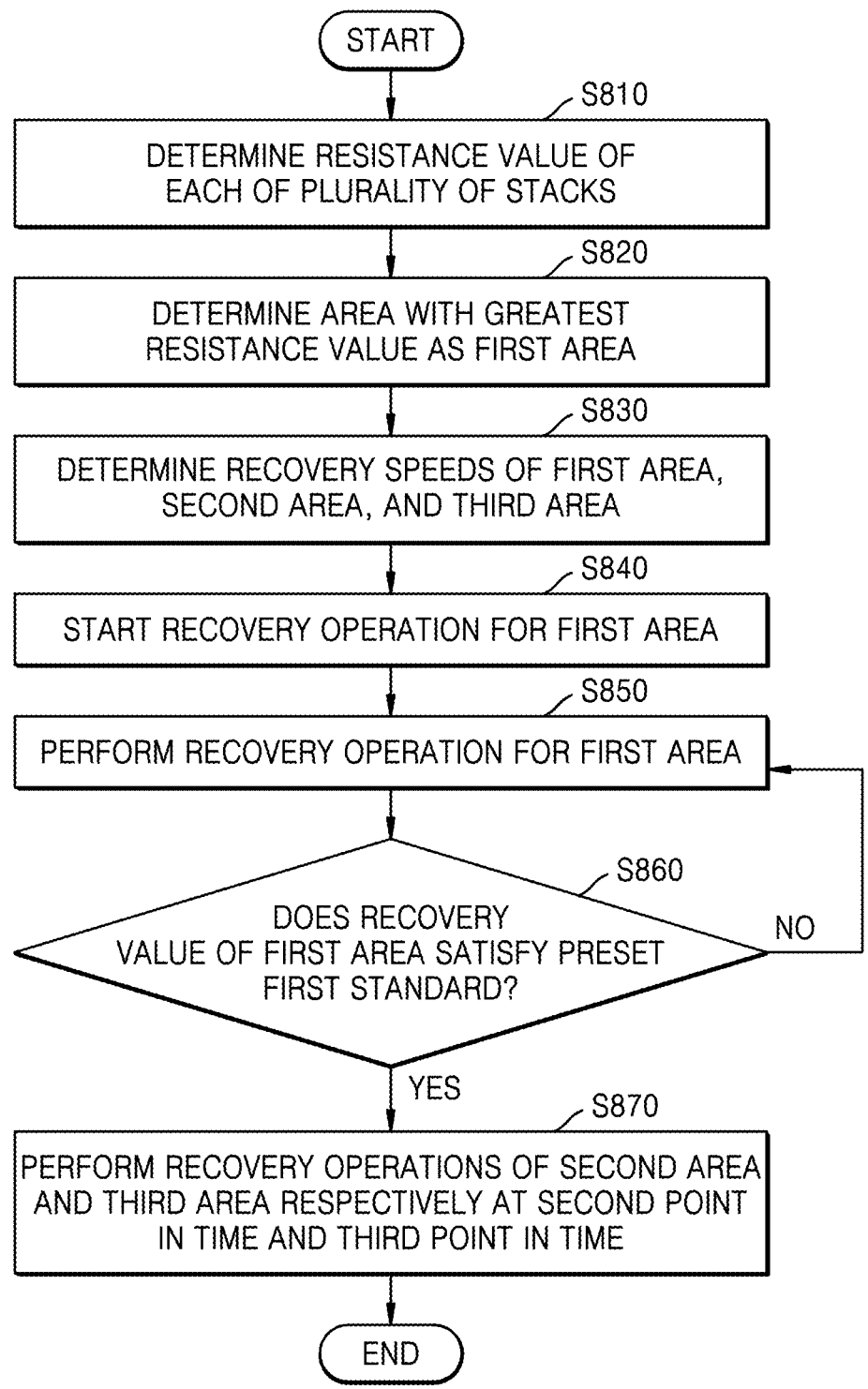
FIG. 8 is a flowchart illustrating a process of determining a start point of a recovery operation according to a recovery speed in performing an operating method of a memory device according to an embodiment.

FIG. 8 is a flowchart illustrating a process of determining a start point in time of a recovery operation according to recovery speed in performing an operating method of a memory device, according to an embodiment.

Referring to FIG. 8, the memory device 100 according to an embodiment may determine respective resistance values of each of a plurality of stacks (S810).

According to one embodiment, a first resistance value may be greater than a second resistance value or a third resistance value. In addition, according to one embodiment, the second resistance value may be equal to or greater than the third resistance value.

When a resistance value of each of a plurality of stacks is determined, the memory device 100 according to an embodiment may determine or identify an area with the greatest resistance value as the first area 121 (S820).

The first area 121 according to an embodiment may have the first resistance value, and the second area 122 according to an embodiment may have the second resistance value. In addition, the third area 123 according to an embodiment may have the third resistance value.

When the first area 121 is determined, the memory device 100 according to an embodiment may determine recovery speeds of the first area 121, the second area 122, and the third area 123 (S830).

For example, when the first resistance value is greater than the second resistance value and the third resistance value, and the second resistance value is equal to the third resistance value, the memory device 100 according to an embodiment may determine that the recovery speed of the first area 121 is less than the recovery speeds of the second area 122 and the third area 123, and may determine that the recovery speed of the second area 122 is equal to the recovery speed of the third area 123.

The memory device 100 according to an embodiment may determine that a resistance value of the first area 121, the second area 122, or the third area 123 is inversely proportional to recovery speed. For example, when the first resistance value of the first area 121 is greater than the second resistance value of the second area 122, the memory device 100 may determine that the recovery speed of the first area 121 is less than the recovery speed of the second area 122. In addition, when the second resistance value of the second area 122 is greater than the third resistance value of the third area 123, the memory device 100 may determine that the recovery speed of the second area 122 is less than the recovery speed of the third area 123.

When the recovery speeds of the first area 121, the second area 122, and the third area 123 are determined, the memory device 100 according to an embodiment starts to perform the recovery operation for the first area 121 (S840).

When the recovery speeds of the respective areas are determined, the memory device 100 according to an embodiment may start the recovery operations in ascending order of recovery speed. For example, when the first resistance value is greater than the second resistance value and the second resistance value is greater than the third resistance value, the memory device 100 may initiate or start to perform the recovery operation for the first area 121 at a first point in time, and in response to or when a recovery value of the first area 121 satisfies a preset first standard, the memory device 100 may initiate or start to perform the recovery operation for the second area 122 at a second point in time that is after the first point in time, and may initiate or start to perform the recovery operation for the third area 123 at a third point in time that is after the second point in time.

According to one embodiment, the first point in time may be a point in time when the recovery operation for the first area 121 starts, the second point in time may be a point in time when the recovery operation for the second area 122 starts, and the third point in time may be a point in time when the recovery operation for the third area 123 starts. The first point in time, the second point in time, or the third point in time according to an embodiment may be different from each other. In addition, when the recovery speed of the second area 122 is equal to the recovery speed of the third area 123, the second point in time may be the same as the third point in time.

When the recovery operation for the first area 121 starts, the memory device 100 according to an embodiment may perform the recovery operation for the first area 121 (S850). For example, the memory device 100 may perform the recovery operation until the first area 121 reaches a preset first standard.

When the recovery operation for the first area 121 is performed, the memory device 100 according to an embodiment may determine whether a recovery value of the first area 121 satisfies the preset first standard (S860).

The preset first standard according to an embodiment may be a recovery value at a point in time when the recovery operation for the first area 121 and the recovery operations of the second area 122 and the third area 123 may simultaneously end. For example, the processor 140 according to an embodiment may perform the recovery operations for each area, but may control a recovery start point in time for each area (e.g., to provide different starting times) such that the respective recovery operations for the areas 121, 122, 123 may have the same end point in time.

When it is determined that the recovery value of the first area satisfies the preset first standard, the memory device 100 according to an embodiment may perform the recovery operations of the second area 122 and the third area 123 at a second point in time (S870).

However, when it is determined that the recovery value of the first area 121 does not satisfy the preset first standard, the memory device 100 according to an embodiment may continuously or continue to perform the recovery operation for the first area 121 (S850).

Figure 9:
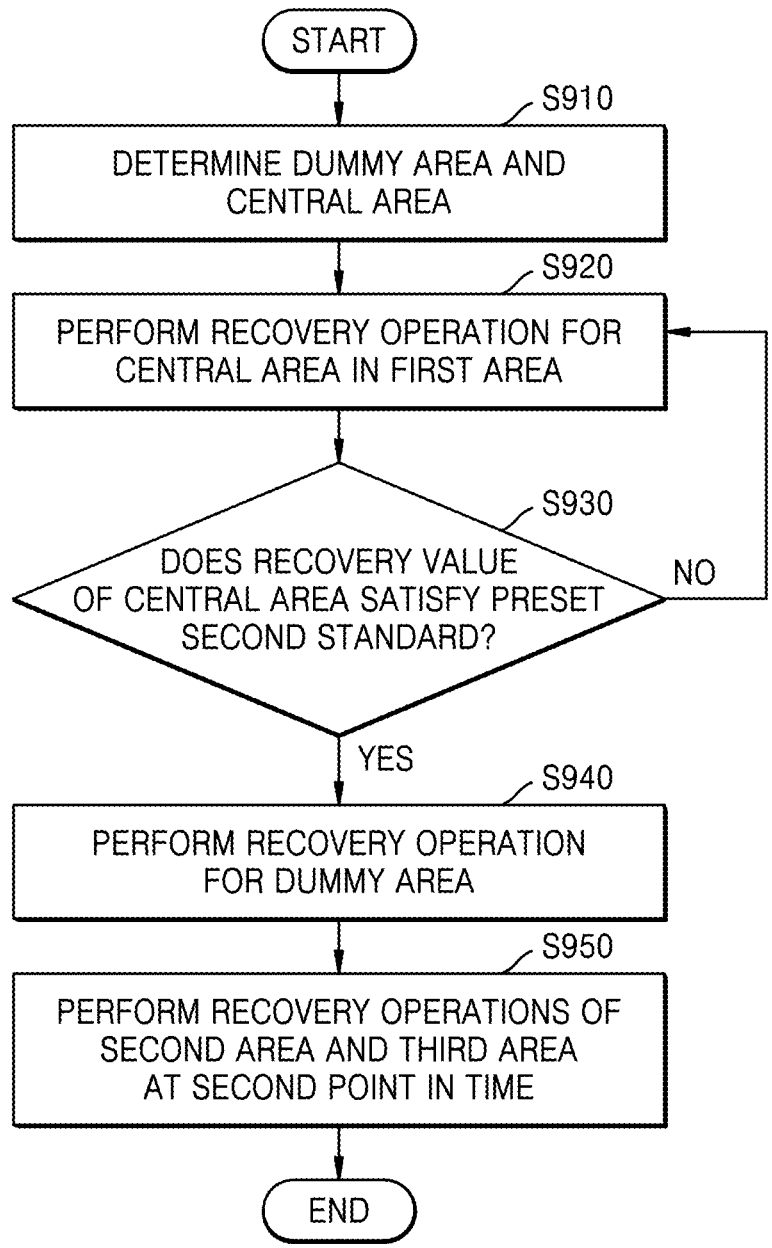
FIG. 9 is a flowchart illustrating a process of performing a recovery operation for a dummy area in performing an operating method of a memory device, according to an embodiment.

FIG. 9 is a flowchart illustrating a process of performing a recovery operation for a dummy area in performing an operating method of a memory device, according to an embodiment.

The memory device 100 according to an embodiment may determine a dummy area and a central area (S910), for example, within a particular stack or area.

When a recovery operation for the first area 121 is performed, the memory device 100 according to an embodiment may divide the first area 121 into a central area and a dummy area. The first area 121 according to an embodiment may include the dummy lines C.DUM5 and C.DUM6 adjacent to the second area 122 and may include the dummy lines C.DUM1 and C.DUM2 adjacent to the third area 123. In the memory device 100 according to an embodiment, an area including the plurality of word lines WL in the first area 121 may be defined as the central area, and an area including the dummy lines C.DUM1, C.DUM2, C.DUM5, and C.DUM6 in the first area 121 may be defined as the dummy area.

When the dummy area and the central area are determined, the memory device 100 according to an embodiment may perform the recovery operation for the central area in the first area 121 (S920).

The memory device 100 according to an embodiment may divide the first area 121 into the central area and the dummy area and perform the recovery operation for the central area earlier than the recovery operation for the dummy area. For example, the memory device 100 may perform the recovery operation for only the central area until a recovery value of the central area reaches a preset second standard.

When recovery operation for the central area of the first area 121 is performed, the memory device 100 according to an embodiment may determine whether the recovery value of the central area satisfies the preset second standard (S930). The preset second standard according to an embodiment may be a recovery value at a point in time when recovery operations of the central area and the dummy area may simultaneously end.

When it is determined that the recovery value of the central area satisfies the preset second standard, the memory device 100 according to an embodiment may perform the recovery operation for the dummy area (S940). However, when it is determined that the recovery value of the central area does not satisfy the preset second standard, the memory device 100 according to an embodiment may continuously or continue to perform the recovery operation for the central area in the first area 121.

When the recovery operation for the dummy area is completed, the memory device 100 according to an embodiment may perform the recovery operations of the second area 122 and the third area 123 at a second point in time (S950). By separately performing recovery operations of the central area and the dummy area in the first area 121, the memory device 100 according to an embodiment may reduce or prevent the dummy area from deteriorating.

Figure 10:
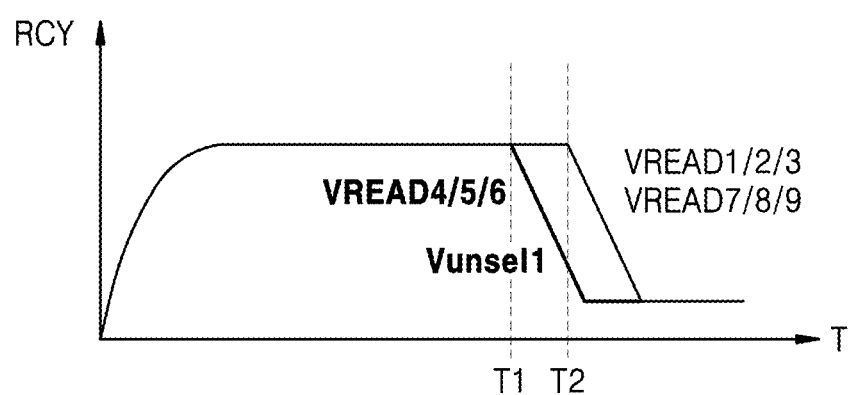
FIGS. 10, 11, and 12 illustrate recovery values according to various embodiments.
Figure 11:
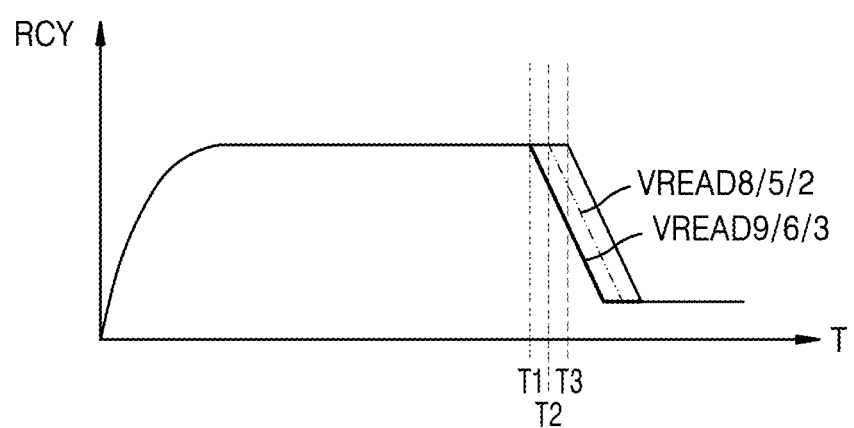
Figure 12:
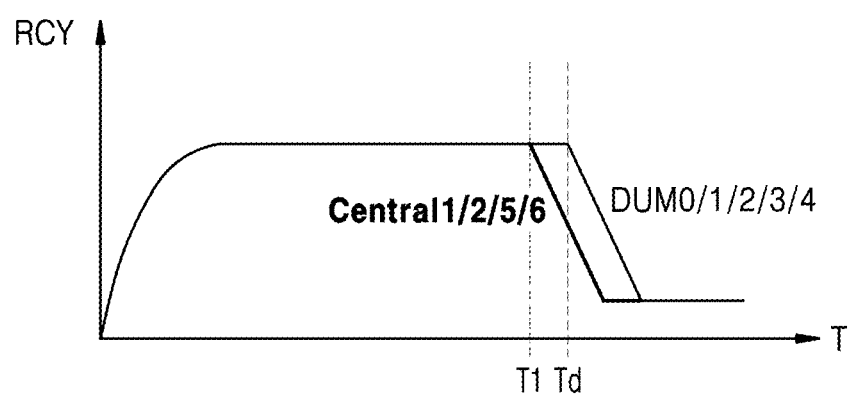

FIGS. 10 to 12 illustrate recovery values according to various embodiments.

For example, FIG. 10 illustrates a result that recovery operation for the first area 121 including an unselected word line Vunsel1 is performed or initiated at a first point in time T1, and recovery operations of the second area 122 and the third area 123 are performed or initiated at or after a second point in time T2. FIG. 11 illustrates a result that the recovery operation for the first area 121 is performed or initiated at the first point in time T1, the recovery operation for the second area 122 is performed or initiated at the second point in time T2, and the recovery operation for the third area 122 is performed or initiated at a third point in time T3. FIG. 12 illustrates that recovery operation for a central area of the first area 121 is first performed and then the recovery operation for a dummy area is performed or initiated at a point in time Td after the first point in time T1.

Hereinafter, the terms "first, second, . . . , n-th" used to classify word lines may be simply terms for classifying the word lines. More generally, the terms "first," "second," etc., may be used herein merely to distinguish one component, element, etc., from another.

Referring to FIG. 10, the memory device 100 according to an embodiment may perform recovery operations VREAD4/5/6 of a fourth word line, a fifth word line, and a sixth word line included in the first area 121 starting at a first point in time T1. When it is determined that the fourth word line, the fifth word line, and the sixth word line satisfy a first standard, the memory device 100 according to an embodiment may perform recovery operations VREAD1/2/3 of the first word line, the second word line, and the third word line in the second area 122 starting at the second point in time T2, which is after T1. In addition, the memory device 100 according to an embodiment may perform recovery operations VREAD7/8/9 of a seventh word line, an eighth word line, and a ninth word line in the third area 123 starting at the second point in time T2.

Referring to FIG. 11, the memory device 100 according to an embodiment may perform recovery operations VREAD9/6/3 of the ninth word line, the sixth word line, and the third word line included in the first area 121 starting at a first point in time T1. When it is determined that the ninth word line, the sixth word line, and the third word line satisfy the first standard, the memory device 100 according to an embodiment may perform recovery operations VREAD8/5/2 of the eighth word line, the fifth word line, and the second word line in the second area starting at a second point in time T2 after T1. In addition, the memory device 100 according to an embodiment may perform the recovery operation for the other word lines that are not recovered starting at the third point in time T3 after T2.

Referring to FIG. 12, the memory device 100 according to an embodiment may perform recovery operation Central1/2/5/6 of a central area starting at a first point in time T1. Thereafter, when a recovery value of the central area satisfies a preset second standard, the recovery operation DUM0/1/2/3/4 of dummy areas may be performed starting at a dummy area recovery point in time Td.

Figure 13:
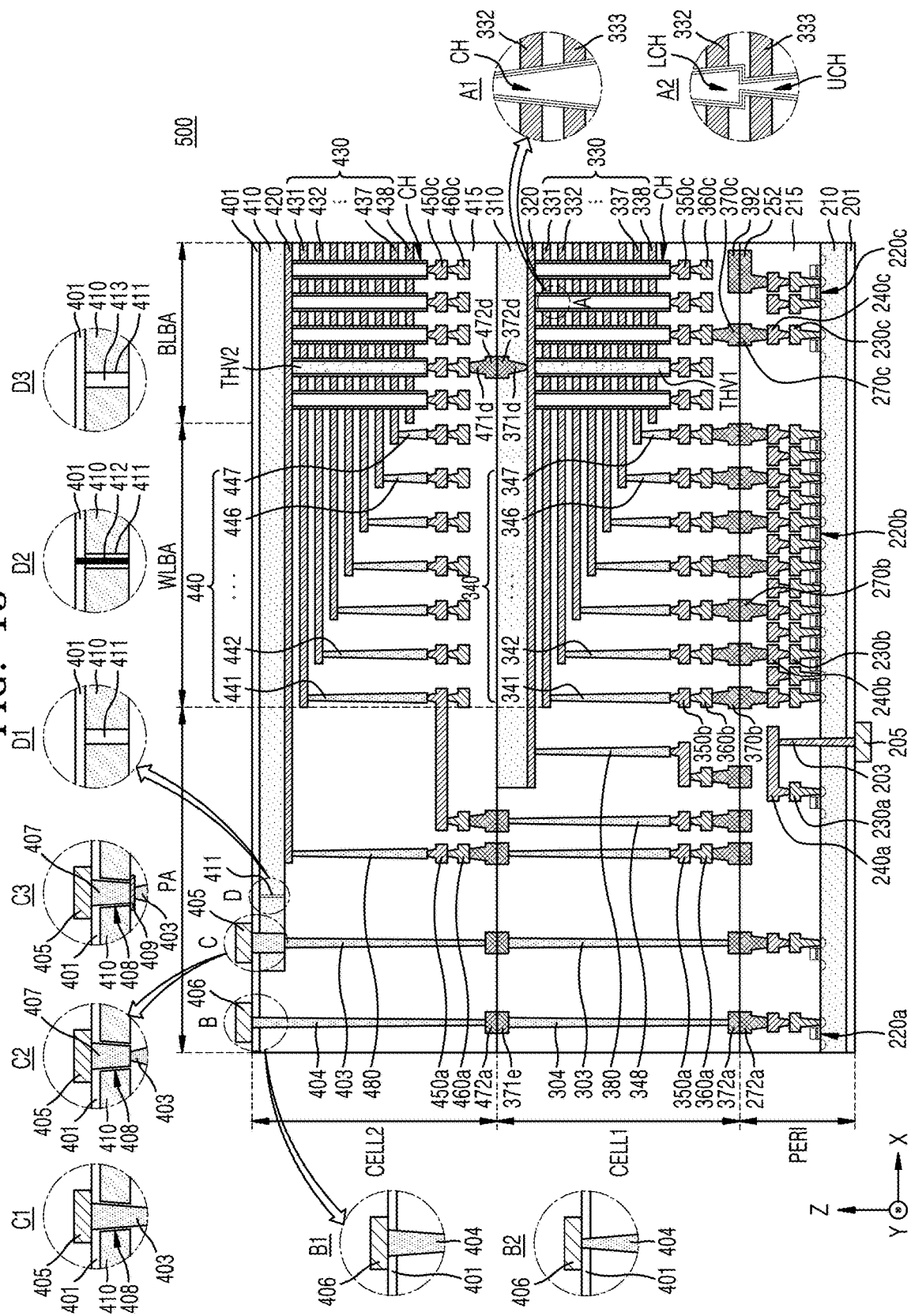
FIG. 13 is a view illustrating a memory device according to an embodiment.

FIG. 13 is a view illustrating a memory device 500 according to an embodiment.

Referring to FIG. 13, the memory device 500 may have a chip to chip (C2C) structure. Here, the C2C structure may include at least one upper chip including cell areas CELL1 and CELL2 and a lower chip including a peripheral circuit area PERI, and the at least one upper chip may be connected to the lower chip by a bonding method. For example, the bonding method may refer to a method of electrically or physically connecting a bonding metal pattern formed in an uppermost metal layer of the upper chip to a bonding metal pattern formed in an uppermost metal layer of the lower chip. For example, when the bonding metal patterns are formed of copper (Cu), the bonding method may be a Cu—Cu bonding method. In another example, the bonding metal patterns may also be formed of aluminum (Al) or tungsten (W).

The memory device 500 may include at least one upper chip including a cell area. For example, as illustrated in FIG. 13, the memory device 500 may include two upper chips. However, this is only an example, and the number of upper chips is not limited thereto. When the memory device 500 includes two upper chips, the memory device 500 may be manufactured by fabricating a first upper chip including the first cell area CELL1, a second upper chip including the second cell area CELL2, and the lower chip including the peripheral circuit area PERI, and then, by connecting the first upper chip, the second upper chip, and the lower chip to each other by using a bonding method. The first upper chip may be reversed (e.g., "flipped") to be connected to the lower chip by the bonding method, and the second upper chip may also be reversed to be connected to the first upper chip by the bonding method. In the following description, upper and lower portions of each of the first and second upper chips may be defined based on the first upper chip and the second upper chip that are not reversed. That is, in FIG. 13, the upper portion of the lower chip may indicate an upper portion defined based on a +Z-axis direction, and the upper portion of each of the first and second upper chips may indicate an upper portion defined based on a −Z-axis direction. However, this is only an example, and only one of the first upper chip and the second upper chip may be reversed to be connected to the first upper chip or the lower chip by the bonding method.

The peripheral circuit area PERI and the first and second cell areas CELL1 and CELL2 of the memory device 500 may include an external pad bonding area PA, a word line bonding area WLBA, and a bit line bonding area BLBA.

The peripheral circuit area PERI may include a first substrate 210 and a plurality of circuit elements 220a, 220b, and 220c formed on the first substrate 210. An interlayer insulating layer 215 including one or more insulating layers may be on each of the plurality of circuit elements 220a, 220b, and 220c, and a plurality of metal wires connecting the plurality of circuit elements 220a, 220b, and 220c to each other may be in the interlayer insulating layer 215. For example, the plurality of metal wires may include first metal wires 230a, 230b, and 230c respectively connected to the plurality of circuit elements 220a, 220b, and 220c, and second metal wires 240a, 240b, and 240c respectively formed on the first metal wires 230a, 230b, and 230c. The plurality of metal wires may be formed of at least one of various conductive materials. For example, the first metal wires 230a, 230b, and 230c may be formed of tungsten with relatively high electrical resistivity, and the second metal wires 240a, 240b, and 240c may be formed of copper with relatively low electrical resistivity.

Although only the first metal wires 230a, 230b, and 230c and the second metal wires 240a, 240b, and 240c are illustrated and described herein, the inventive concept is not limited thereto, and at least one additional metal wire may be formed on the second metal wires 240a, 240b, and 240c. In this case, the second metal wires 240a, 240b, and 240c may be formed of aluminum. In addition, at least some of the additional metal wires formed on the second metal wires 240a, 240b, and 240c may be formed of copper or so on with lower electrical resistivity than aluminum of the second metal wires 240a, 240b, and 240c.

The interlayer insulating layer 215 may be on the first substrate 210 and may include an insulating material, such as silicon oxide or silicon nitride.

Each of the first and second cell areas CELL1 and CELL2 may include at least one memory block. The first cell area CELL1 may include a second substrate 310 and a common source line 320. A plurality of word lines 331 to 338 (330) may be stacked on the second substrate 310 in a direction (a Z-axis direction) perpendicular to an upper surface of the second substrate 310. String select lines and a ground select line may be above and below the plurality of word lines 330, and the plurality of word lines 330 may be between the string select lines and the ground select line. In addition, the second cell area CELL2 may include a third substrate 410 and a common source line 420, and a plurality of word lines 431 to 438 (430) may be stacked in a direction perpendicular to an upper surface of the third substrate 410 (the Z-axis direction). The second substrate 310 and the third substrate 410 may be formed of various materials, such as a substrate including a monocrystalline epitaxial layer grown on, for example, a silicon substrate, a silicon-germanium substrate, a germanium substrate, or a monocrystalline silicon substrate. A plurality of channel structures CH may be formed in each of the first and second cell areas CELL1 and CELL2.

In one embodiment, as illustrated in A1, the channel structure CH may be in the bit line bonding area BLBA and extend in a direction perpendicular to an upper surface of the second substrate 310 to penetrate the plurality of word lines 330, the string select lines, and the ground select line. The channel structure CH may include a data storage layer, a channel layer, and a buried insulating layer. The channel layer may be electrically connected to a first metal wire 350c and a second metal wire 360c in the bit line bonding area BLBA. For example, the second metal wire 360c may also be referred to as a bit line 360c and may be connected to the channel structure CH through the first metal wire 350c. The bit line 360c may extend in a first direction (a Y-axis direction) parallel to an upper surface of the second substrate 310.

In one embodiment, as illustrated in A2, the channel structure CH may include a lower channel LCH and an upper channel UCH which are connected to each other. For example, the channel structure CH may be formed through a process for the lower channel LCH and a process for the upper channel UCH. The lower channel LCH may extend in a direction perpendicular to the upper surface of the second substrate 310 to penetrate the common source line 320 and lower word lines 331 and 332 of the plurality of word lines 331 to 338. The lower channel LCH may include a data storage layer, a channel layer, and a buried insulating layer and may be connected to the upper channel UCH. The upper channel UCH may penetrate upper word lines 333 to 338 of the plurality of word lines 331 to 338. The upper channel UCH may include a data storage layer, a channel layer, and a buried insulating layer, and the channel layer of the upper channel UCH may be electrically connected to the first metal wire 350c and the second metal wire 360c. As a length of a channel increases, it may be difficult to form a channel with a constant or uniform width due to process reasons. The memory device 500 according to an embodiment may include a channel with improved width uniformity through the lower channel LCH and the upper channel UCH which are formed through a sequential process.

When the channel structure CH includes the lower channel LCH and the upper channel UCH as illustrated in A2, a word line near a boundary between the lower channel LCH and the upper channel UCH may be a dummy word line. For example, a word line 332 and a word line 333 forming a boundary between the lower channel LCH and the upper channel UCH may be dummy word lines. In this case, data may not be stored in memory cells connected to the dummy word line. Alternatively, the number of pages corresponding to the memory cells connected to the dummy word lines may be less than the number of pages corresponding to memory cells connected to general word lines. A level of a voltage applied to the dummy word line may be different from a level of a voltage applied to the general word line, and thus, an effect of a difference in channel widths between the lower channel LCH and the upper channel UCH due to non-uniform channel widths thereof on operation of a memory device may be reduced.

In addition, A2 shows that the number of lower word lines 331 and 332 that the lower channel LCH penetrates is less than the number of upper word lines 333 to 338 that the upper channel UCH penetrates. However, this is only an example, and the inventive concept is not limited thereto. In another example, the number of lower word lines penetrated by the lower channel LCH may be equal to or greater than the number of upper word lines penetrated by the upper channel UCH. In addition, the structure and connection relationship of the channel structure CH in the first cell area CELL1 described above may be equally or similarly applied to the channel structure CH in the second cell area CELL2.

In the bit line bonding area BLBA, a first through-electrode THV1 may be provided in the first cell area CELL1, and a second through-electrode THV2 may be provided in the second cell area CELL2. As illustrated in FIG. 13, the first through-electrode THV1 may penetrate the common source line 320 and the plurality of word lines 330. However, this is only an example, and the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may be provided in the same shape and structure as the first through-electrode THV1.

In one embodiment, the first through-electrode THV1 may be electrically connected to the second through-electrode THV2 through a first through-metal pattern 372*d* and a second through-metal pattern 472*d*. The first through-metal pattern 372*d* may be in the bottom of the first upper chip including the first cell area CELL1, and the second through-metal pattern 472*d* may be in the top of the second upper chip including the second cell area CELL2. The first through-electrode THV1 may be electrically connected to the first metal wire 350*c* and the second metal wire 360*c*. A lower via 371*d* may be between the first through-electrode THV1 and the first through-metal pattern 372*d*, and an upper via 471*d* may be between the second through-electrode THV2 and the second through-metal pattern 472*d*. The first through-metal pattern 372*d* may be connected to the second through metal pattern 472*d* by a bonding method.

In addition, in the bit line bonding area BLBA, an upper metal pattern 252 is in an uppermost metal layer of the peripheral circuit area PERI, and an upper metal pattern 392 with the same shape as the upper metal pattern 252 may be in an uppermost metal layer of the first cell area CELL1. The upper metal pattern 392 of the first cell area CELL1 may be electrically connected to the upper metal pattern 252 of the peripheral circuit area PERI by a bonding method. In the bit line bonding area BLBA, the bit line 360*c* may be electrically connected to a page buffer included in the peripheral circuit area PERI. For example, some of the circuit elements 220*c* of the peripheral circuit area PERI may provide a page buffer, and the bit line 360*c* may be electrically connected to the circuit element 220*c* providing the page buffer through the upper bonding metal 370*c* of the first cell area CELL1 and the upper bonding metal 270*c* of the peripheral circuit area PERI.

In addition, referring to FIG. 13, in the word line bonding area WLBA, the plurality of word lines 330 of the first cell area CELL1 may extend in a second direction (an X-axis direction) parallel to an upper surface of the second substrate 310 and may be connected to a plurality of cell contact plugs 341 to 347 (340). First metal wires 350*b* and second metal wires 360*b* may be sequentially connected to each other in an upper portion of the plurality of cell contact plugs 340 respectively connected to the plurality of word lines 330. In the word line bonding area WLBA, the plurality of cell contact plugs 340 may be connected to the peripheral circuit area WLBA respectively through the upper bonding metals 370*b* of the first cell area CELL1 and the upper bonding metals 270*b* of the peripheral circuit area PERI.

The plurality of cell contact plugs 340 may be electrically connected to a row decoder included in the peripheral circuit area PERI. For example, some of the circuit elements 220*b* of the peripheral circuit area PERI may provide a row decoder, and the plurality of cell contact plugs 340 may be respectively electrically connected to the circuit elements 220*b* providing the row decoder respectively through the upper bonding metals 370*b* of the first cell area CELL1 and the upper bonding metals 270*b* of the circuit area PERI. In one embodiment, operating voltages of the circuit elements 220*b* providing the row decoder may be different from operating voltages of the circuit elements 220*c* providing the page buffer. For example, the operating voltages of the circuit elements 220*c* providing the page buffer may be higher than the operating voltages of the circuit elements 220*b* providing the row decoder.

In addition, in the word line bonding area WLBA, the plurality of word lines 430 of the second cell area CELL2 may extend in a second direction (the X-axis direction) parallel to an upper surface of the third substrate 410 and may be connected to the plurality of cell contact plugs 441 to 447 (440). The plurality of cell contact plugs 440 may be connected to the peripheral circuit area PERI through an upper metal pattern of the second cell area CELL2, lower and upper metal patterns of the first cell area CELL1, and a cell contact plug 348.

In the word line bonding area WLBA, the upper bonding metal 370*b* may be in the first cell area CELL1, and an upper bonding metal 270*b* may be in the peripheral circuit area PERI. The upper bonding metal 370*b* of the first cell area CELL1 may be electrically connected to the upper bonding metal 270*b* of the peripheral circuit area PERI by a bonding method. The upper bonding metal 370*b* and the upper bonding metal 270*b* may be formed of aluminum, copper, or tungsten.

In the external pad bonding area PA, a lower metal pattern 371*e* may be in a lower portion of the first cell area CELL1, and an upper metal pattern 472*a* may be in an upper portion of the second cell area CELL2. In the external pad bonding area PA, the lower metal pattern 371*e* of the first cell area CELL1 may be connected to the upper metal pattern 472*a* of the second cell area CELL2 by a bonding method. In addition, an upper metal pattern 372*a* may be in an upper portion of the first cell area CELL1, and an upper metal pattern 272*a* may be in an upper portion of the peripheral circuit area PERI. The upper metal pattern 372*a* of the first cell area CELL1 may be connected to the upper metal pattern 272*a* of the peripheral circuit area PERI by a bonding method.

Common source line contact plugs 380 and 480 may be in the external pad bonding area PA. The common source line contact plugs 380 and 480 may be formed of a conductive material, such as metal, a metal compound, or doped polysilicon. The common source line contact plug 380 of the first cell area CELL1 may be electrically connected to the common source line 320, and the common source line contact plug 480 of the second cell area CELL2 may be electrically connected to the common source line 420. A first metal wire 350*a* and a second metal wire 360*a* may be sequentially stacked on the common source line contact plug 380 of the first cell area CELL1, and a first metal wire 450*a* and a second metal wire 460a may be sequentially stacked on the common source line contact plug 480 of the second cell area CELL2.

First, second, and third input/output pads 205, 405, and 406 may be in the external pad bonding area PA. Referring to FIG. 13, a lower insulating layer 201 may cover a lower surface of the first substrate 210, and the first input/output pad 205 may be on the lower insulating layer 201. The first input/output pad 205 may be connected to at least one of the plurality of circuit elements 220a in the peripheral circuit area PERI through a first input/output contact plug 203 and may be separated from the first substrate 210 by the lower insulating layer 201. In addition, a side insulating layer may be between the first input/output contact plug 203 and the first substrate 210 to electrically separate the first input/output contact plug 203 from the first substrate 210.

An upper insulating layer 401 covering an upper surface of the third substrate 410 may be on the third substrate 410. The second input/output pad 405 and/or the third input/output pad 406 may be on the upper insulating layer 401. The second input/output pad 405 may be connected to at least one of the plurality of circuit elements 220a in the peripheral circuit area PERI through second input/output contact plugs 403 and 303, and the third input/output pad 406 may be connected to at least one of the plurality of circuit elements 220a in the peripheral circuit area PERI through third input/output contact plugs 404 and 304.

In one embodiment, the third substrate 410 may not be in an area where an input/output contact plug is provided. For example, as illustrated in B1 and B2, the third input/output contact plug 404 may be separated from the third substrate 410 in a direction parallel to an upper surface of the third substrate 410 and may be connected to the third input/output pad 406 through an interlayer insulating layer 415 of the second cell area CELL2. In this case, the third input/output contact plug 404 may be formed through various processes.

For example, as illustrated in B1, the third input/output contact plug 404 may extend in a third direction (the Z-axis direction) and may have an increasing diameter toward the upper insulating layer 401. That is, while a diameter of the channel structure CH described with reference to A1 is decreased toward the upper insulating layer 401, the diameter of the third input/output contact plug 404 may be increased toward the upper insulating layer 401. For example, the third input/output contact plug 404 may be formed after the second cell area CELL2 is bonded to the first cell area CELL1.

In addition, for example, as illustrated in B2, the third input/output contact plug 404 may extend in the third direction (the Z-axis direction) and have a decreasing diameter toward the upper insulating layer 401. That is, the diameter of the third input/output contact plug 404 may be decreased toward the upper insulating layer 401 like the channel structure CH. For example, the third input/output contact plug 404 may be formed together with the plurality of cell contact plugs 440 before the second cell area CELL2 is bonded to the first cell area CELL1.

In another embodiment, the input/output contact plug 404 may overlap the third substrate 410. For example, as illustrated in C1, C2, and C3, the second input/output contact plug 403 may penetrate the interlayer insulating layer 415 of the second cell area CELL2 in the third direction (the Z-axis direction) and may be electrically connected to the second input/output pad 405 through the third substrate 410. In this case, a connection structure between the second input/output contact plug 403 and the second input/output pad 405 may be implemented in various ways.

For example, as illustrated in C1, an opening 408 penetrating the third substrate 410 may be formed, and the second input/output contact plug 403 may be directly connected to the second input/output pad 405 through the opening 408 formed in the third substrate 410. In this case, as illustrated in C1, a diameter of the second input/output contact plug 403 may be increased toward the second input/output pad 405. However, this is only an example, and the diameter of the second input/output contact plug 403 may be decreased toward the second input/output pad 405.

For example, as illustrated in C2, an opening 408 penetrating the third substrate 410 may be formed, and a contact 407 may be formed in the opening 408. One end of the contact 407 may be connected to the second input/output pad 405, and the other end thereof may be connected to the second input/output contact plug 403. Accordingly, the second input/output contact plug 403 may be electrically connected to the second input/output pad 405 through the contact 407 in the opening 408. In this case, as illustrated in C2, a diameter of the contact 407 may be increased toward the second input/output pad 405, and a diameter of the second input/output contact plug 403 may be decreased toward the second input/output pad 405. For example, the second input/output contact plug 403 may be formed together with the plurality of cell contact plugs 440 before the second cell area CELL2 is bonded to the first cell area CELL1, and the contact 407 may be formed after the second cell area CELL2 is bonded to the first cell area CELL1.

In addition, for example, as illustrated in C3, a stopper 409 may be further formed on an upper surface of the opening 408 of the third substrate 410 compared to C2. The stopper 409 may be a metal wire formed on the same layer as the common source line 420. However, this is only an example, and the stopper 409 may be a metal wire formed on the same layer as at least one of the plurality of word lines 430. The second input/output contact plug 403 may be electrically connected to the second input/output pad 405 through the contact 407 and the stopper 409.

In addition, similarly to the second and third input/output contact plugs 403 and 404 of the second cell area CELL2, the second and third input/output contact plugs 303 and 304 of the first cell area CELL1 may have diameters decreasing toward the lower metal pattern 371e or diameters increasing toward the lower metal pattern 371e.

In addition, according to embodiments, a slit 411 may be formed in the third substrate 410. For example, the slit 411 may be formed in a random position of the external pad bonding area PA. For example, as illustrated in D1, D2, and D3, the slit 411 may be between the second input/output pad 405 and the plurality of cell contact plugs 440 in a plan view. However, this is only an example, and the slit 411 may be formed such that the second input/output pad 405 is between the slit 411 and the plurality of cell contact plugs 440 in a plan view.

For example, as illustrated in D1, the slit 411 may penetrate the third substrate 410. For example, the slit 411 may be used to prevent the third substrate 410 from being finely cracked when the opening 408 is formed. However, this is only an example, and the slit 411 may have a depth of about 60% to about 70% of a thickness of the third substrate 410.

In addition, for example, as illustrated in D2, a conductive material 412 may be formed in the slit 411. For example, the conductive material 412 may be used to discharge a leakage current, which is generated during operation of circuit elements in the external pad bonding area PA, to the outside. In this case, the conductive material 412 may be connected to an external ground line.

In addition, for example, as illustrated in D3, an insulating material 413 may be formed in the slit 411. For example, the insulating material 413 may electrically separate the second input/output pad 405 and the second input/output contact plug 403 in the external pad bonding area PA from the word line bonding area WLBA. By forming the insulating material 413 in the slit 411, a voltage provided through the second input/output pad 405 may be prevented from affecting a metal layer on the third substrate 410 in the word line bonding area WLBA.

In addition, according to embodiments, the first, second, and third input/output pads 205, 405, and 406 may be selectively formed. For example, the memory device 500 may include only the first input/output pad 205 on the first substrate 201, only the second input/output pad 405 on the third substrate 410, or only the third input/output pad 406 on the upper insulating layer 401.

In addition, according to embodiments, at least one of the second substrate 310 of the first cell area CELL1 and the third substrate 410 of the second cell area CELL2 may be used as a sacrificial substrate and may be completely or partially removed before or after a bonding process. An additional layer may be formed after a substrate is removed. For example, the second substrate 310 of the first cell area CELL1 may be removed before or after the peripheral circuit area PERI is bonded to the first cell area CELL1, and an insulating layer covering an upper surface of the common source line 320 or a conductive layer for connection may be formed. Similarly to this, the third substrate 410 of the second cell area CELL2 may be removed before or after the first cell area CELL1 is bonded to the second cell area CELL2, and the upper insulating layer 401 covering an upper surface of the common source line 420 or a conductive layer for connection may be formed.

While the inventive concept has been particularly illustrated and described with reference to embodiments thereof, it will be understood that various changes in form and details may be made therein without departing from the scope of the following claims.

What is claimed is:

1. A memory device, comprising:
   a word line area between a bit line and a common source line, the word line area comprising a plurality of stacks including first, second, and third stacks;
   a first area comprising the first stacks with a first resistance value in the word line area;
   a second area comprising the second stacks with a second resistance value in the word line area, wherein the second resistance value is different from the first resistance value; and
   a third area comprising the third stacks with a third resistance value that is different from the first resistance value in the word line area; and
   a processor configured to control a recovery sequence of the first area, the second area, and the third area,
   wherein the processor is configured to perform a first recovery operation for the first area starting at a first point in time, and
   wherein the processor is configured to perform a second recovery operation for the second area and a third recovery operation for the third area starting at or after a second point in time that is different from the first point in time.

2. The memory device of claim 1, wherein
   recovery speeds of the first area, the second area, and the third area are based on the first resistance value, the second resistance value, and the third resistance value, respectively, and
   the first resistance value is greater than the second resistance value and the third resistance value.

3. The memory device of claim 2, wherein
   the first resistance value, the second resistance value, and the third resistance value are inversely proportional to the recovery speeds, and
   the processor is configured to perform the first recovery operation for the first area starting at the first point in time, the second recovery operation for the second area starting at the second point in time that is different from the first point in time, and the third recovery operation for the third area starting at a third point in time that is different from the first point in time and the second point in time.

4. The memory device of claim 2, wherein at least one of the first stacks of the first area is a same distance from the bit line and the common source line.

5. The memory device of claim 2, wherein
   the second area is adjacent the bit line, and
   the third area is adjacent the common source line.

6. The memory device of claim 1, wherein
   a distance between the first area and the bit line is greater than a distance between the second area and the bit line, and
   a distance between the first area and the common source line is greater than a distance between the third area and the common source line.

7. The memory device of claim 1, wherein
   the first area includes a dummy area adjacent the second area or the third area and includes a central area excluding the dummy area, and
   the processor is configured to perform a recovery operation for the dummy area starting when a recovery value of the central area reaches a preset second standard.

8. The memory device of claim 1, wherein, when the first area comprises an unselected word line, and when a recovery value of a central area excluding a dummy area reaches a preset second standard, the processor is configured to initiate a recovery operation for the dummy area.

9. An operating method of a memory device for recovering a word line area that is between a bit line and a common source line and includes a plurality of stacks comprising first, second, and third stacks, the operating method comprising:
   performing a first recovery operation for a first area in the word line area comprising the first stacks starting at a first point in time; and
   performing a second recovery operation for a second area in the word line area comprising the second stacks and a third recovery operation for a third area in the word line area comprising the third stacks starting at or after a second point in time that is different from the first point in time.

10. The operating method of claim 9, further comprising:
    determining respective resistance values of the plurality of stacks, and identifying an area with a greatest resistance value among the respective resistance values as the first area; and
    determining recovery speeds of the first area, the second area, and the third area responsive to identifying the first area.

11. The operating method of claim 10, wherein the performing of the second recovery operation for the second area and the third recovery operation for the third area comprises:
  determining that the respective resistance values are inversely proportional to the recovery speeds; and
  starting the first recovery operation for the first area at the first point in time, starting the second recovery operation for the second area at the second point in time that is different from the first point in time when a recovery value of the first area satisfies a preset first standard, and starting the third recovery operation for the third area at a third point in time that is different from the first point in time and the second point in time.

12. The operating method of claim 10, wherein the starting of the first recovery operation for the first area includes identifying, as the first area, an area including at least one of the plurality of stacks with a same distance to the bit line and the common source line.

13. The operating method of claim 10, wherein the performing of the second recovery operation for the second and the third recovery operation for the third area comprises:
  identifying an area comprising a stack adjacent the bit line among the plurality of stacks as the second area; and
  identifying an area comprising a stack adjacent the common source line as the third area.

14. The operating method of claim 9, wherein the performing of the first recovery operation for the first area comprises:
  determining that a distance between the first area and the bit line is greater than a distance between the second area and the bit line; and
  determining that a distance between the first area and the common source line is greater than a distance between the third area and the common source line.

15. The operating method of claim 9, wherein the performing of the first recovery operation for the first area comprises:
  identifying a dummy area adjacent the first area and one of the second area or the third area, and identifying a central area excluding the dummy area; and
  starting a recovery operation for the dummy area when a recovery value of the central area reaches a preset second standard.

16. The operating method of claim 9, further comprising:
  controlling a recovery operation for a dummy area to start when the first area comprises an unselected word line and when a recovery value of a central area excluding the dummy area reaches a preset second standard.

17. A memory device, comprising:
  a word line area that is between a bit line and a common source line, the word line area comprising a plurality of stacks including first, second, and third stacks,
  a first area comprising the first stacks with a first resistance value in the word line area;
  a second area comprising the second stacks with a second resistance value in the word line area, wherein the second resistance value is different from the first resistance value; and
  a third area comprising the third stacks with a third resistance value that is different from the first resistance value in the word line area,
  wherein the memory device is configured to perform a first recovery operation for the first area starting at a first point in time, and
  wherein the memory device is configured to perform at least one of a second recovery operation for the second area or a third recovery operation for the third area starting at a second point in time that is different from the first point in time.

18. The memory device of claim 17, wherein
  respective recovery speeds of the first area, the second area, and the third area are based on the first resistance value, the second resistance value, and the third resistance value, respectively, and
  the first resistance value is greater than the second resistance value and the third resistance value.

19. The memory device of claim 18, wherein
  the first resistance value, the second resistance value, and the third resistance value are inversely proportional to the respective recovery speeds, and
  the memory device is configured to perform the first recovery operation for the first area starting at the first point in time, the second recovery operation for the second area starting at the second point in time that is different from the first point in time, and the third recovery operation for the third area starting at a third point in time that is different from the first point in time and the second point in time.

20. The memory device of claim 17, wherein
  a distance between the first area and the bit line is greater than a distance between the second area and the bit line, and
  a distance between the first area and the common source line is greater than a distance between the third area and the common source line.

* * * * *